United States Patent
Solana

(10) Patent No.: US 9,611,397 B2
(45) Date of Patent: Apr. 4, 2017

(54) FLAME-APPLIED RESIN POWDER COATING FOR SWIMMING POOL AND RECREATIONAL SURFACES

(71) Applicant: Joseph Solana, Doylestown, PA (US)

(72) Inventor: Joseph Solana, Doylestown, PA (US)

(73) Assignee: Eco Finish, LLC, Warminster, PA (US)

( * ) Notice: Subject to any disclaimer, the term of this patent is extended or adjusted under 35 U.S.C. 154(b) by 0 days.

(21) Appl. No.: 14/328,448

(22) Filed: Jul. 10, 2014

(65) Prior Publication Data

US 2015/0017326 A1    Jan. 15, 2015

Related U.S. Application Data

(60) Provisional application No. 61/844,707, filed on Jul. 10, 2013.

(51) Int. Cl.
| | |
|---|---|
| *B05D 1/08* | (2006.01) |
| *B05D 3/08* | (2006.01) |
| *C09D 5/16* | (2006.01) |
| *C09D 163/00* | (2006.01) |
| *E04H 4/00* | (2006.01) |

(52) U.S. Cl.
CPC .............. *C09D 5/16* (2013.01); *C09D 163/00* (2013.01); *E04H 4/00* (2013.01)

(58) Field of Classification Search
CPC ............ C09D 163/00; C09D 5/16; E04H 4/00
USPC .................... 427/195, 259, 290, 299, 386
See application file for complete search history.

(56) References Cited

U.S. PATENT DOCUMENTS

| | | | |
|---|---|---|---|
| 2,919,381 A | 10/1959 | Vogel | |
| 3,429,085 A | 2/1969 | Stillman, Jr. | |
| 6,146,709 A * | 11/2000 | Katz | B05D 1/10 |
| | | | 427/195 |

(Continued)

FOREIGN PATENT DOCUMENTS

| | | | |
|---|---|---|---|
| GB | 1048846 | 11/1966 | |
| WO | WO 95/33579 | 12/1995 | |
| WO | WO 2012170369 A1 * | 12/2012 | ............... C08K 5/17 |

OTHER PUBLICATIONS

International Search Report and Written Opinion received for PCT Patent Application PCT/US14/046195, mailed Nov. 3, 2014, 10 pages.

(Continued)

*Primary Examiner* — Alexander Weddle
(74) *Attorney, Agent, or Firm* — Douglas J. Ryder; Ryder, Lu, Mazzeo & Konieczny, LLC

(57) ABSTRACT

Application of a resin to a pool surface to provide a colored finish that is ultraviolet resistant. The resin may be a powder that can be melted at a fairly low temperature and applied to the pool surface. A first later of resin may be applied (thermally sprayed) to an epoxy layer that is applied to the pool surface after the epoxy has become tacky and before it has cured to provide better adhesion and cause the resin and the epoxy to blend into a single layer. An additional layer of resin may be applied after the epoxy and the first layer of resin fully cured. After the second layer of resin has cured an additional layer may be applied to provide designs and/or markings. The designs/markings may be produced with tape and/or stencils and the next layer may be applied to the non-covered areas to provide the desired look.

23 Claims, 4 Drawing Sheets

(56) References Cited

U.S. PATENT DOCUMENTS

| | | |
|---|---|---|
| 7,600,309 B2 | 10/2009 | Meadows |
| 2002/0114940 A1* | 8/2002 | Clemens et al. ........... 428/318.4 |
| 2011/0236574 A1 | 9/2011 | Hanna |

OTHER PUBLICATIONS

EUIPO, Supplementary Search Report and Search Opinion, EP Patent App. 14822305.0, mailed Feb. 8, 2017, 9 pages.

* cited by examiner

FLAME-APPLIED RESIN POWDER COATING FOR SWIMMING POOL AND RECREATIONAL SURFACES

PRIORITY

This application claims the priority under 35 USC §119 of Provisional Application 61/844,707 entitled "Flame-Applied Resin Powder Coating for Swimming Pool and Recreational Surfaces" having Joseph I. Solana as inventor. Application 61/844,707 is herein incorporated by reference in its entirety.

BACKGROUND

Pools can be made of a variety of materials including, but not limited to, concrete, plaster, fiberglass, metal, vinyl, tiles or some combination thereof. The pools may include different colors and/or designs on the walls and/or floor of the pool. The colors and/or designs may be formed by the material the pool is made of (e.g., the tiles may form a design, the plaster may be colored) or the color/designs may be applied after completion of the pool (e.g., pool may be painted a certain color). The colors and patterns may be susceptible to fading and/or staining from the sun and the pool water.

Pools may be repainted when required and/or desired. However, a repainted pool is susceptible to the elements as well. Moreover, the pool may need to be dried for several days before a new coat of paint may be applied.

DETAILED DESCRIPTION

The application of a resin to the pool may provide a finished surface that has better protection against the elements (e.g., ultraviolet light, water) than paint, tiles, colored plaster and the like. The resin may come in the form of powder that can be melted and applied to the pool surface. The resin may include the colors desired and may be ultraviolet resistant so that the color does not fade, for example due to the ultraviolet rays of the sun, for a fairly long time. The resin may be designed to melt and become a liquid at a fairly low temperature (e.g., less than approximately 100 degrees Celsius). The resin may also be designed to have a high melt flow, which means that it will lay flat after application in a relatively short amount of time.

Rather than apply the resin directly to the pool surface the resin may be applied to an epoxy layer that is applied to the pool surface to provide better adhesion. According to one embodiment, the resin may be applied once the epoxy becomes tacky and before it is cured. The application of the resin while the epoxy is still tacky (before it's hard) causes the resin and the epoxy to blend into a single layer. The layer of resin applied at this point may be a thin layer. An additional layer of resin may be applied after the epoxy and the first layer of resin fully cure. According to one embodiment, after the second layer of resin has cured an additional layer may be applied to provide designs, markings or the like. The designs and/or markings may be produced with tape and/or stencils and the next layer may be applied to the non-covered areas to provide the desired look.

Figure 1:
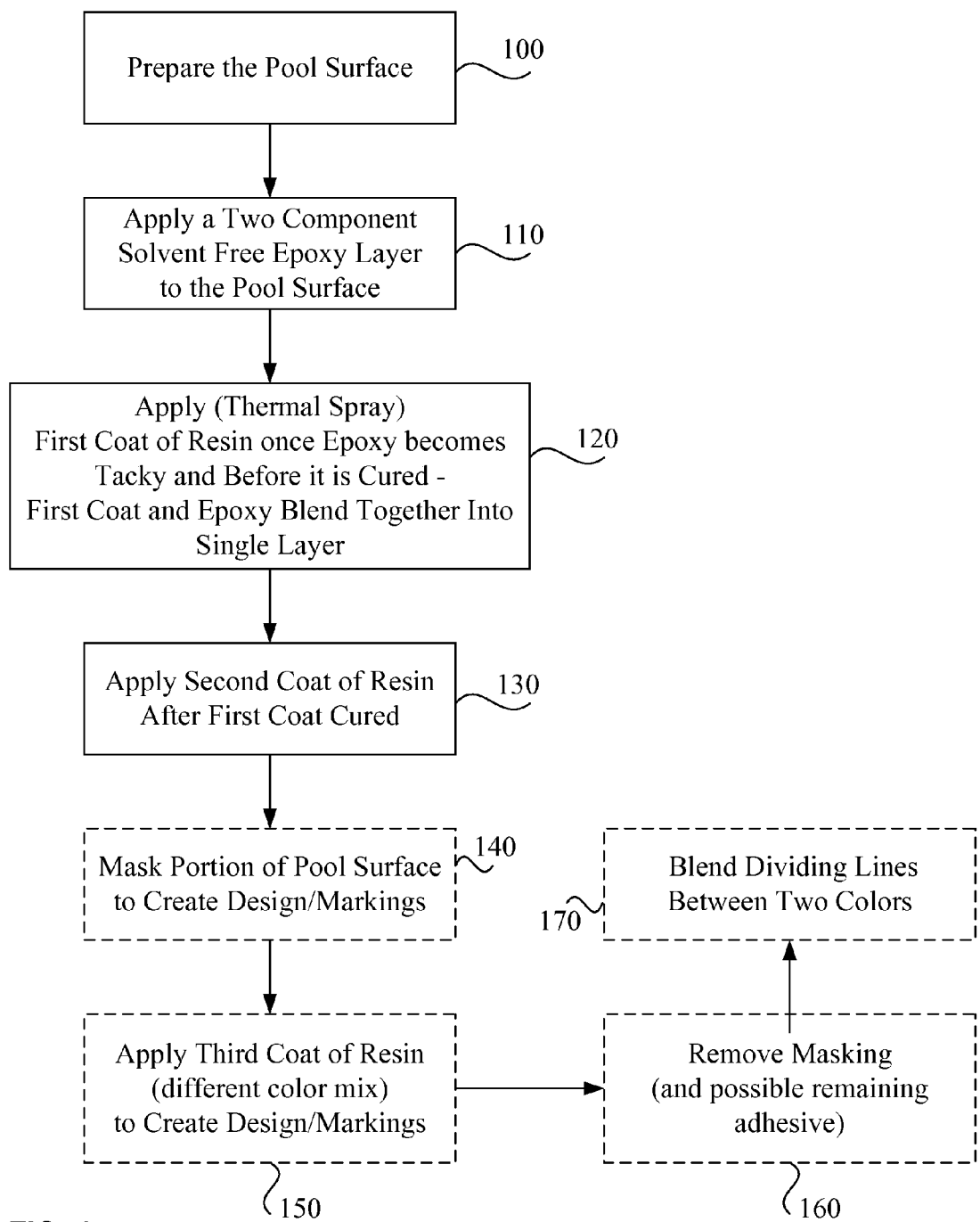
FIG. 1 illustrates a block diagram of an exemplary method of applying a resin finish to a pool surface, according to one embodiment.

FIG. 1 illustrates a block diagram of an exemplary method of applying a resin finish to a pool surface. Initially the pool surface may be prepared 100. The pool surface may be concrete, plaster, fiberglass, tile, wood, metal or other materials capable of acting as a pool (e.g., holding water) and receiving the resin and handling heat necessary for application (discussed in more detail later). The preparation of the pool surface may include cleaning the surface of loose materials and surface contamination, repairing defects and etching the surface so that it has a rough texture that an epoxy will adhere to better. The exact steps required for preparation depend on the material that the pool is made of.

Figure 2:
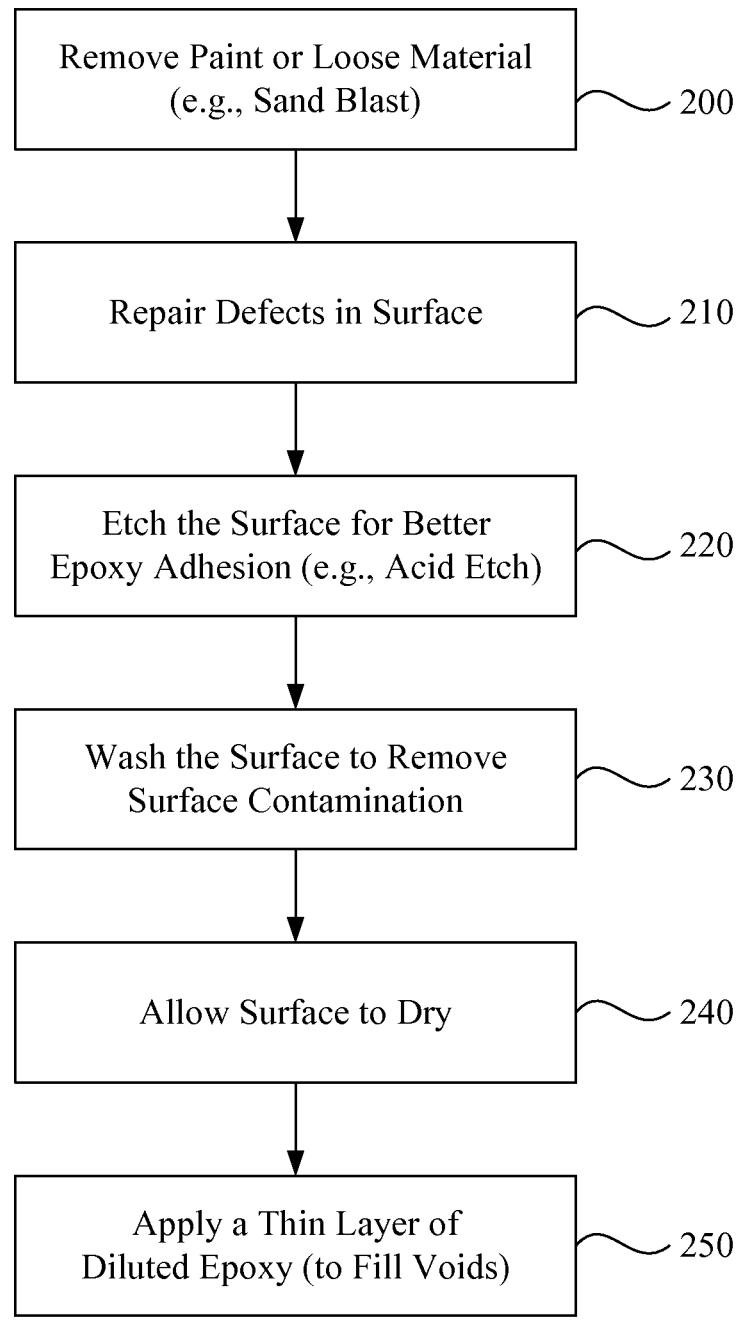
FIG. 2 illustrates a block diagram of an exemplary method of preparing a concrete pool surface, according to one embodiment.

FIG. 2 illustrates a block diagram of an exemplary method of preparing a concrete pool surface. Initially if the pool is painted or has loose material, the pool surface is sand or media blasted to clean and remove any loose material and expose the clean cementeous surface 200. Defects in the pool surface are then repaired 210. The repair may include patching voids and/or sanding extrusions. After the surface is repaired, the pool surface may be etched 220. The etching may be an acid etching using a combination of acid and water. The etching is to remove contaminations such as loose surface material, scale, calcium build-up and to provide a rough surface for the epoxy to adhere. According to one embodiment, the surface should be etched so that it has a texture similar to approximately 80-120 grit sandpaper.

The surface is then washed to remove pool chemicals, dirt, oil and any other surface contaminations as well as any residual acid 230. The surface may be washed using a power washer. According to one embodiment, a tri-sodium phosphate (TSP) or an appropriate alternative may be used with the power washing. After the power washing, the pool surface may be allowed to completely dry 240. Any number of means may be used to expedite the drying of the surface, including using heat from thermal sprayers used to apply the resin (discussed in more detail later) or fans to assist in the flow and movement of air over the surface.

In order to fill minor voids that may be contained in the surface a thin layer of diluted epoxy may be applied to the surface 250. The diluted epoxy may be an approximate 50/50 combination of epoxy and a Xylene solvent. The diluted epoxy is a low viscous epoxy that may seep deep into pores creating a deeper bond and will help eliminate pin holes in the resin finish when it is applied. Depending on the porosity of the surface a second thin layer of the diluted epoxy may be applied.

Figure 3:
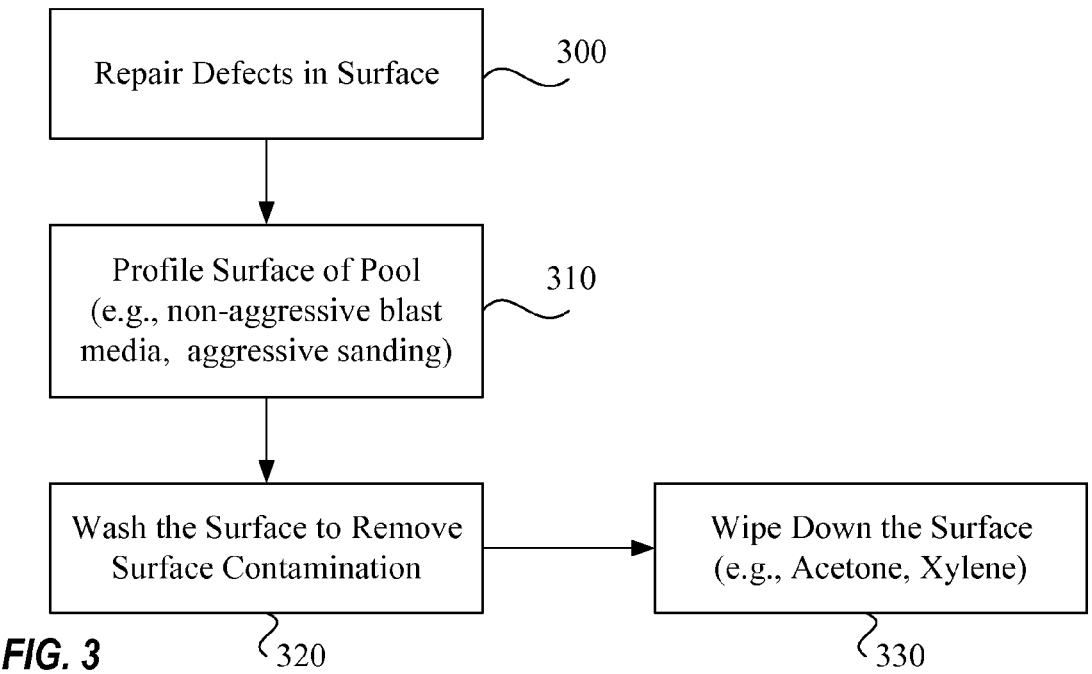
FIG. 3 illustrates a block diagram of an exemplary method of preparing a fiberglass pool surface, according to one embodiment.

FIG. 3 illustrates a block diagram of an exemplary method of preparing a fiberglass pool surface. Initially any defects in the surface of the pool are repaired 300. All adhering contaminants are removed and the surface of the pool is profiled (roughened) by lightly blasting with a non-aggressive blast media or by aggressively sanding with approximately 80-100 grit sandpaper 310. The surface is then washed to remove pool chemicals, dirt, oil and any other surface contaminations as well as any residual acid 320. The surface may be washed using a power washer. According to one embodiment, a TSP or the like may be used with the power washing. After the power washing, the pool surface may be wiped down 330. According to one embodiment, the surface may be wiped down using Acetone, Xylene or other suitable solvents.

Figure 4:
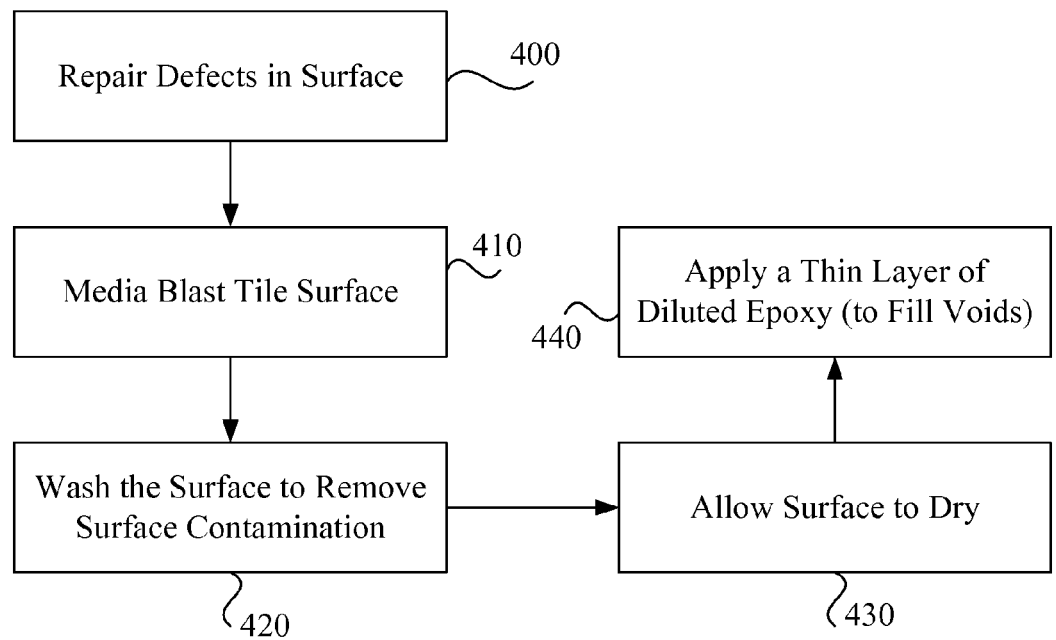
FIG. 4 illustrates a block diagram of an exemplary method of preparing a tile pool surface, according to one embodiment.

FIG. 4 illustrates a block diagram of an exemplary method of preparing a tile pool surface. Initially any defects in the tiles are repaired 400. The tile glaze is etched, for example by media blasting, to create a rough surface with a non-aggressive blast media or by aggressively sanding with approximately 80-100 grit sandpaper 410. The surface is then washed to remove pool chemicals, dirt, oil and any other surface contaminations as well as any residual acid 420. The surface may be washed using a power washer. According to one embodiment, a TSP or the like may be used with the power washing. After the power washing, the pool surface may be allowed to completely dry 430. Any number of means may be used to expedite the drying of the surface, including using heat from thermal sprayers used to apply the resin or fans to assist in the flow and movement of air over the surface. A thin layer of diluted epoxy (e.g., approximate 50/50 combination of epoxy and a Xylene solvent) may be applied to the tiles 440.

Figure 5:
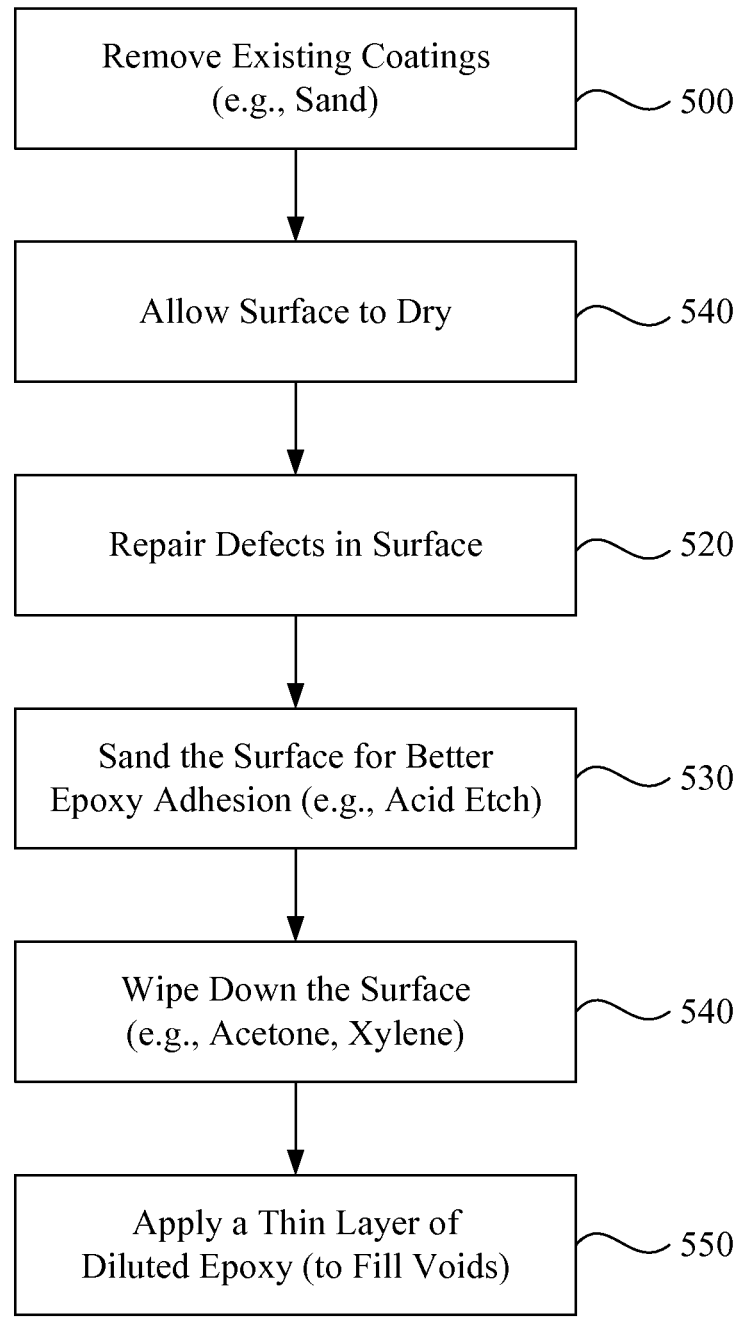
FIG. 5 illustrates a block diagram of an exemplary method of preparing a wood surface, according to one embodiment.

FIG. 5 illustrates a block diagram of an exemplary method of preparing a wood surface. Initially if the wood has a coating (e.g., paint, clear coat), the surface is sanded to remove the coating and smooth any rough edges 500. The wood surface is then allowed to completely dry 510. Any number of means may be used to expedite the drying of the surface. Defects (e.g., cracks, pores, voids) in the wood surface are then repaired 520. The defects may be repaired using a heat resistant caulk or wood filler. The wood surface is then sanded to provide a rough surface for the epoxy to adhere 530. According to one embodiment, the wood surface should have a texture similar to approximately 80-100 grit sandpaper.

The wood surface may be wiped down 540. According to one embodiment, the surface may be wiped down using Acetone, Xylene or other suitable solvents. A thin layer of diluted epoxy (e.g., approximate 50/50 combination of epoxy and a Xylene solvent) may be applied to the wood surface 550. The diluted (low viscous) epoxy may seep deep into pores of the wood. Depending on the porosity of the wood a second thin layer of the diluted epoxy may be applied.

The surfaces that the resin can be applied to is not limited to those surfaces noted above and discussed with respect to FIGS. 2-5. Furthermore, the preparation of the surfaces is not limited to the steps discussed above. Rather, steps may be added, steps may removed, the order of steps may be changed, steps may be combined, steps may be split apart, and/or steps may be modified without departing from the current scope.

Referring back to FIG. 1, after the pool surface is prepared a layer of epoxy is applied to the surface 110. The epoxy may be a solvent free epoxy resin specifically designed for application to pool surfaces (e.g., concrete). The epoxy may be a two part epoxy that is mixed (with for example a paddle mixer for approximately two minutes) prior to application. The epoxy may be applied using a roller. According to one embodiment, the epoxy should be applied with a thin nap roller as a thick nap roller may result in bubbled and/or uneven application. When applying the epoxy effort should be made to ensure you have an exit path out of the pool.

Once the epoxy begins to become tacky (before it is cured) a first coat of resin is applied to the surface of the pool using a thermal sprayer (the first coat of resin is thermally sprayed onto the surface of the pool) 120. The application (thermal spraying) of the resin to the uncured epoxy layer which in effect causes the two layers to merge (the resin integrates with the epoxy). The thermal sprayer includes a gas source (e.g., propane) that is ignited to create a flame that is blown out of the thermal sprayer. The thermal sprayer also includes a housing for holding the resin and feeding the resin into the flame as it blows the resin out of the thermal sprayer. The flame melts the resin as the resin passes throw the flame and/or after the resin has been blown out of the thermal sprayer and is on the surface. The resin may also act as fuel for the flame and increase the size of the flame as the resin passes therethough. The resin is blown out of the thermal sprayer onto the pool surface. As noted, if the resin is not fully melted as it is blown out of the thermal sprayer and adhered to the surface it can be further melted by heating the surface with the thermal sprayer.

The resin may be designed to melt and become a liquid at a fairly low temperature (e.g., less that approximately 100 degrees Celsius). Accordingly, the thermal sprayer may be operated at approximately 100° C.

The first coat of resin may be lightly applied. The resin may be lightly applied by setting the thermal sprayer to a low feed rate so that a small amount of melted resin is blown onto the surface at a time. The resin may have a high melt flow so that it lays flat after application in a relatively short amount of time. The first coat of resin may have a defined color mix. The application of the first coat may lightly coat the pool surface. The light coating may cover the original color of the pool surface, however some of the original color may show through. The merged layer of the first coat of resin and the epoxy layer acts as a barrier to the pool surface being a heat sink. This enables further coatings to be melted quicker. According to one embodiment, the application of the first coat of resin should start at the bottom of the pool and work up from there. Since heat rises the surface above where the resin is currently being applied will be heated up so the resin can be applied to the these areas quicker as the epoxy will already be heated (these layers will be integrated quicker).

When applying (thermal spraying) the first coat of resin effort should be made to ensure you have an exit path out of the pool.

The newly created layer of epoxy and resin should be allowed to fully cure. Once fully cured, a second coat of resin is applied (thermal sprayed) using the thermal sprayer 130. For this pass you want to completely cover the pool surface. Prior to applying (thermal spraying) the second coat you want to heat the surface until the previously applied first coat of resin starts to turn glossy. Accordingly, as you are applying the second coat you may have to alternate between simply heating the surface with the flame and spraying the resin. Once the second coat of resin has been applied to a section of the pool surface you may want to heat the resin until it starts to turn glossy. You continue to do sections of the pool surface until the entire pool surface has been covered with the second coat. The pool surface should now completely be covered with the defined color mix associated with the resin. If required certain sections may reheated to melt out the resin so that it obtains the desired glossy finish.

When applying the second coat of resin effort should be made to ensure you have an exit path out of the pool.

When using the thermal sprayer to apply the resin there are thermal sprayer parameters (e.g., sprayer air, material flow rate, flame heat) and operator parameters (e.g., pass speed, spray distance) to consider. Sprayer air is the amount of air used to transport the resin through the flame and onto the surface. The sprayer air also shields the resin powder as it flows through the flame. Too little sprayer air may result in the resin burning as it passes through the flame while too much sprayer air may result in cooling the resin as you're trying to heat it. Material feed rate is the speed at which the material is feed through the flame and onto the surface. A faster rate will enable more resin to be applied but too fast of a rate may cause a build-up of resin. A slow rate may result in the resin not coating the surface and cause you to have to re-spray an area and thus work slower. Flame heat is the heat used to melt the resin powder. Too much heat may result in burning the powder and also using excess fuel. Too little heat and the powder may not process (e.g., melt) appropriately. As noted above, the resin is designed to melt at, or slightly below, approximately 100° C.

Pass speed is the speed at which an individual applying the resin moves the thermal sprayer over the surface. If the speed is to fast not enough resin will be applied to the surface while if the speed is too slow resin build-up may occur. Spray distance is the distance the thermal sprayer is away from the surface. Spraying from farther away will cover a larger area with less material. Spraying too far away may result in an inaccurate spray as gravity, wind, or the like may affect the spray pattern. Spraying closer will cover a smaller area with more material. Spray distance may also affect the temperature which may affect the resin. Spraying too close my result in burning the resin while spraying too far may enable the resin to cool prior to application to the surface.

Some pools may want more than a single color mix applied to the pool. For example, some pools may desire to have multiple colors forming some type of pattern in the pool (e.g., wave patterns). Some pools may desire to place markings (e.g., depth) on the pool. This can be accomplished using layering techniques. If patterns, markings, or the like are desired a second color mix of resin may be applied on top of the first color mix of resin after the first color mix of resin has dried. Steps utilized for patterns/markings are included in dotted lines as they are optional.

In order to create the pattern or the markings, a portion of the pool surface (having first color mix of resin) may be masked 140. The masking may utilize tape or stencils to create the desired pattern or markings. The tape and/or stencils utilized may be silicon coated. The tape and/or stencils utilized may be made from the type of material that is utilized to secure items to glass. The areas around the patterns created that you do not want to be coated with the second color mix of resin may be covered. After the pattern has been formed and the surrounding areas covered, a coat of a second color mixture of resin is applied (thermal sprayed) to the desired areas 150. This coat of resin is applied in a similar manner to the other coats of resin.

Once the second color mix of resin has cooled sufficiently, remove the masking 160. Be careful not to remove the masking too early or the resin may stick thereto and be pulled off the pool surface. When the masking is taken off some of the adhesive may be left behind on the pool surface. The adhesive may be removed using a solvent such as Goo Gone or Acetone. Once the masking has been removed, the two color schemes of resin may be blended by heating the border between the two color schemes using the thermal sprayer (or a heat gun). The heating of the border melts the two colors and helps eliminate any hard lines between the colors. Care should be taken not to overheat the resin because it may cause the first color scheme (lower layer) to bleed through the second color scheme (upper layer) or may burn the resin.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A method for applying a resin finish to a pool surface, the method comprising:
   preparing the pool surface;
   applying an adhesive layer to the pool surface, wherein the adhesive layer does not include any solvents when it is applied;
   applying a first coat of the resin finish onto the adhesive layer using a thermal sprayer prior to the adhesive layer curing so that the first coat of the resin finish and the adhesive layer blend into a single layer that acts as a barrier to the pool surface acting as a heat sink, wherein the resin finish becomes liquid at, or less than, approximately 100° C.; and
   the thermal sprayer is operated at temperatures sufficient to have the resin finish become liquid;
   allowing the single layer to cure;
   heating the cured single layer using the thermal sprayer until the first coat of resin finish contained therewithin becomes glossy; and
   applying a second coat of the resin finish onto the glossy cured single layer using the thermal sprayer.

2. The method of claim 1, wherein the preparing includes cleaning the pool surface.

3. The method of claim 1, wherein the preparing includes filling imperfections in the pool surface.

4. The method of claim 1, wherein the preparing includes making the pool surface rough by way of mechanical or chemical means.

5. The method of claim 1, wherein the adhesive layer is a solvent free epoxy.

6. The method of claim 1, wherein
   at least a portion of the first coat of the resin finish is liquidus prior to contacting the adhesive layer; and
   any portion of the first coat of the resin finish that is not melted sufficiently prior to contacting the adhesive layer is melted subsequent thereto by heating the portion with the thermal sprayer.

7. The method of claim 1, further comprising
   masking a portion of the second coat after the second coat has cured; and
   applying an additional resin finish onto a portion of the second coat not masked using the thermal sprayer, wherein the additional resin finish has a different color mix than the first and the second coat of resin finish in order to create patterns or markings for the pool surface within the second coat.

8. The method of claim 7, further comprising
   removing the masking after the additional resin finish has cooled;
   heating a border between the first and second coat of the resin finish and the additional resin finish to blend the different color mixes along the border.

9. The method of claim 7, wherein the masking includes taping the portion of the second coat.

10. The method of claim 7, wherein the masking includes applying a stencil onto the second coat.

11. The method of claim 1, further comprising applying an additional resin finish onto a portion of the second coat after the second coat has cured using the thermal sprayer, wherein the additional resin finish has a different color mix than the first and the second coat of resin finish in order to create patterns or markings for the pool surface within the second coat.

12. The method of claim 1, wherein when the pool surface is concrete/plaster the preparing includes applying a sealant layer to seal small voids in the pool surface.

13. The method of claim 12, wherein the sealant layer is the adhesive layer thinned with a solvent.

14. A method for applying a resin finish to a pool surface, the method comprising:
preparing the pool surface;
applying an adhesive layer to the pool surface, wherein the adhesive layer does not include any solvents when it is applied;
applying a first coat of a first color mixture of the resin finish onto the adhesive layer using a thermal sprayer prior to the adhesive layer curing so that the first coat of the first color mixture of the resin finish and the adhesive layer blend into a single layer that acts as a barrier to the pool surface acting as a heat sink, wherein the resin finish becomes liquid at, or less than, approximately 100° C.; and
the thermal sprayer is operated at temperatures sufficient to have the resin finish become liquid;
allowing the single layer to cure;
heating the cured single layer using the thermal sprayer until the first coat of the first color mixture of the resin finish contained therewithin becomes glossy;
applying a second coat of the first color mixture of the resin finish onto the glossy cured single layer using the thermal sprayer; and
applying a second color mixture of the resin finish onto a portion of the second coat after the second coat of the first color mixture has cured in order to create a two tone effect.

15. The method of claim 14, further comprising heating a border between the first color mixture of the resin and the second color mixture of resin to blend the first color mixture and the second color mixture along the border.

16. The method of claim 14, further comprising masking a portion of the second coat, wherein the applying the second color mixture of the resin finish includes applying the second color mixture of the resin finish onto a portion of the second coat not masked.

17. The method of claim 16, further comprising
removing the masking after the second color mixture of the resin finish has cooled;
heating a border between the first color mixture of the resin and the second color mixture of resin to blend the first color mixture and the second color mixture along the border.

18. The method of claim 14, wherein the adhesive layer is a solvent free epoxy.

19. The method of claim 14, wherein the preparing the pool surface includes applying a sealant layer to seal small voids in the pool surface.

20. The method of claim 19, wherein the sealant layer is the adhesive layer thinned with a solvent.

21. A method for applying a resin finish to a pool surface, the method comprising:
cleaning the pool surface;
filling imperfections in the pool surface;
applying a sealant layer to seal small voids in the pool surface, wherein the sealant layer includes solvents when it is applied;
allowing the sealant layer to cure;
applying an adhesive to the cured sealant layer, wherein the adhesive layer does not include any solvents when it is applied;
applying a first coat of a first color mixture of the resin finish onto the adhesive layer using a thermal sprayer prior to the adhesive layer curing so that the first coat of the first color mixture of the resin finish and the adhesive layer blend into a single layer that acts as a barrier to the pool surface acting as a heat sink, wherein the resin finish becomes liquid at, or less than, approximately 100° C.; and
the thermal sprayer is operated at temperatures sufficient to have the resin finish become liquid;
allowing the single layer to cure;
heating the cured single layer using the thermal sprayer until the first coat of the first color mixture of the resin finish contained therewithin becomes glossy;
applying a second coat of the first color mixture of the resin finish onto the glossy cured single layer using the thermal sprayer;
masking a portion of the second coat after the second coat of the first color mixture has cured; and
applying a second color mixture of the resin finish onto a portion of the second coat that is not masked in order to create a two tone effect.

22. The method of claim 21, further comprising
removing the masking after the second color mixture of the resin finish has cooled;
heating a border between the first color mixture of the resin and the second color mixture of resin to blend the first color mixture and the second color mixture along the border.

23. The method of claim 21, wherein the adhesive layer is a solvent free epoxy and the sealant layer is the solvent free epoxy thinned with a solvent.

* * * * *